United States Patent
Floutier et al.

(10) Patent No.: US 11,954,807 B2
(45) Date of Patent: Apr. 9, 2024

(54) METHOD FOR GENERATING A VIRTUAL REPRESENTATION OF A REAL ENVIRONMENT, DEVICES AND CORRESPONDING SYSTEM

(71) Applicant: Orange, Issy-les-Moulineaux (FR)

(72) Inventors: Christophe Floutier, Chatillon (FR); Maxime Jouin, Chatillon (FR); Valérie Ledunois, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 105 days.

(21) Appl. No.: 17/596,819

(22) PCT Filed: Jun. 10, 2020

(86) PCT No.: PCT/EP2020/066110
§ 371 (c)(1),
(2) Date: Dec. 17, 2021

(87) PCT Pub. No.: WO2020/254171
PCT Pub. Date: Dec. 24, 2020

(65) Prior Publication Data
US 2022/0319121 A1 Oct. 6, 2022

(30) Foreign Application Priority Data
Jun. 18, 2019 (FR) ...................... 1906530

(51) Int. Cl.
*G06T 19/00* (2011.01)
*G06F 3/01* (2006.01)
*G06T 15/00* (2011.01)

(52) U.S. Cl.
CPC ............ *G06T 19/006* (2013.01); *G06F 3/011* (2013.01); *G06T 15/005* (2013.01)

(58) Field of Classification Search
None
See application file for complete search history.

(56) References Cited

U.S. PATENT DOCUMENTS

2015/0097719 A1* 4/2015 Balachandreswaran ............... G01B 11/002
342/147
2016/0054837 A1* 2/2016 Stafford ............... G02B 27/01
463/33

(Continued)

FOREIGN PATENT DOCUMENTS

FR 3074332 A1 5/2019

OTHER PUBLICATIONS

The Archi VR App by Metason, downloaded © ARchi VR—Capture rooms with your iPhone/iPad (archive.org), archived on Sep. 18, 2018 (Year: 2018).*

(Continued)

*Primary Examiner* — Yingchun He
(74) *Attorney, Agent, or Firm* — David D. Brush; Westman, Champlin & Koehler, P.A.

(57) ABSTRACT

A method for generating an at least 2-dimensional virtual representation of a real environment is disclosed, the generation being performed by a mixed virtual reality headset intended to be worn by a user, the mixed virtual reality headset being associated with at least one interface device. The generation method includes acquiring relative coordinates in the real environment, corresponding to a position of the interface device in the real environment; following an interaction of the user on the interface device, determining, as a function of the relative coordinates of the position of the interface device in the real environment, a corresponding point in the virtual representation; and generating the virtual representation from at least the point associated with the relative coordinates of the acquired position of the interface device. The development also relates to a mixed virtual reality headset and a corresponding interface device.

14 Claims, 3 Drawing Sheets

(56) References Cited

U.S. PATENT DOCUMENTS

2019/0043259 A1    2/2019  Wang et al.
2020/0111262 A1*   4/2020  Rabinovich ........... G06F 3/0346

OTHER PUBLICATIONS

International Search Report for International Application No. PCT/EP2020/066110, dated Sep. 15, 2020.
Written Opinion of the International Searching Authority dated Sep. 15, 2020 for corresponding International Application No. PCT/EP2020/066110, filed Jun. 10, 2020.

* cited by examiner

METHOD FOR GENERATING A VIRTUAL REPRESENTATION OF A REAL ENVIRONMENT, DEVICES AND CORRESPONDING SYSTEM

CROSS-REFERENCE TO RELATED APPLICATIONS

This application is filed under 35 U.S.C. § 371 as the U.S. National Phase of Application No. PCT/EP2020/066110 entitled "METHOD FOR GENERATING A VIRTUAL REPRESENTATION OF A REAL ENVIRONMENT, DEVICES AND CORRESPONDING SYSTEM" and filed Jun. 10, 2020, and which claims priority to FR 1906530 filed Jun. 18, 2019, each of which is incorporated by reference in its entirety.

BACKGROUND

Field

The development relates to the virtual representation of a real environment, such as a 2D plan or a 3D representation, and more particularly to the generation of a virtual representation of the real environment from a mixed virtual reality headset.

Description of the Related Technology

In order to generate a 3D representation of a real space, professionals generally use a 3D scanner which allows scanning the room or space to be modelled. However, the use of such a device requires a calibration of the apparatus, and a good positioning in the space to be mapped for taking measurements. Moreover, the modelling obtained from data measured by a 3D scanner is still not optimal, in particular in the case where the space to be modelled includes obstacles, for example in the case of a furnished room. Modelling then requires manual retouching which can be tedious and require a certain level of expertise with CAD tools (for Computer Aided Design). In addition, the cost of a 3D scanner is quite high.

Another method for generating a 3D representation of a real space is the use of an existing 2D plan, manually generated or obtained from a file. However, such a method requires specialised skills in the use of modelling software. In addition, architect's 2D plans, when available, are sometimes slightly offset relative to the actual performance.

There is therefore a need to improve the state of the art.

SUMMARY OF CERTAIN INVENTIVE ASPECTS

For this purpose, it relates to a method for generating an at least 2-dimensional virtual representation of a real environment, the generation being implemented by a mixed virtual reality headset intended to be worn by a user, the mixed virtual reality headset being associated with at least one interface device.

Advantageously, according to the development, the generation method comprises: an acquisition of relative coordinates in the real environment, corresponding to a position of said interface device in the real environment, following an interaction of the user on said interface device, a determination depending on said relative coordinates of the position of said interface device in the real environment of a corresponding point in the virtual representation, a generation of said virtual representation from at least the point associated with the relative coordinates of the acquired position of said interface device.

The development thus allows generating a virtual representation of a real environment to scale, from measurements made in this real environment. The measuring is facilitated by the advantageous use of a mix mixed virtual reality headset associated with an interface device that the user manipulates and positions in places where he wishes taking measurements for modelling the real environment.

The term "mixed virtual reality headset" means herein a virtual reality headset adapted to visualise both the real environment and the generated virtual representation.

The use of such a headset for the generation method according to the development provides the advantage that when taking measurements, the user sees where he is placing the interface device since he can see through the headset. In addition, this type of headset operates autonomously in that it does not require the installation of sensors to determine the position of the user wearing the headset in real space or the position of the interface device. Thus, the placement of the headset for taking measurements is simple.

The development allows a simplification of the acquisition of the real data for modelling the real environment thanks to the use of consumer equipment that is easy to use, at a reasonable price and therefore accessible to a greater number of users. In particular, the generation method according to the development does not require expertise in modelling software or in measurement. It also allows limiting the risk of errors in the statement of the plans of the real environment.

According to a particular embodiment of the development, the relative coordinates are defined relative to a reference position of the real environment, the reference position corresponding to an initial position of the virtual reality headset associated with a point of origin of a reference frame of said virtual representation.

According to another particular embodiment of the development, when at least two points of the virtual representation are successively associated with at least two acquired positions of said interface device in the real environment, a virtual element is generated in the virtual representation. Advantageously, the size of the virtual element generated in the virtual representation is to scale relative to the distance between the two positions acquired in the real environment.

According to this particular embodiment of the development, the addition in the virtual representation of a virtual element to scale relative to the real environment is facilitated. Such a virtual element can be an existing element of the real environment, or else a purely virtual element added by the user in the virtual representation but without equivalent in the real environment. The term "virtual element" means for example a plan element such as a wall, ceiling, door, window, trees, hedges, paths, etc. . . . or else a virtual object such as a luminaire, electrical socket, radiators, furniture, etc., or else a geometric element such as a line, a planar, concave or convex surface, etc.

According to another particular embodiment of the development, a type of the virtual element is previously selected from a library of virtual element types.

According to this particular embodiment of the development, a list of virtual element types is proposed to the user for selection before said user defines the size thereof in the virtual representation.

According to another particular embodiment of the development, when the virtual element is a plan element, the library of virtual element types comprises at least any one of the following types: wall, window, door, floor, ceiling, luminaire, electrical socket, radiator, path, lawn, hedge, tree.

According to another particular embodiment of the development, the mixed virtual reality headset displays the virtual representation to the user.

According to another particular embodiment of the development, when the virtual representation is a 3-dimensional representation, the display of said virtual representation is carried out in superposition with the real environment viewed by the user via the mixed virtual reality headset.

According to this particular embodiment of the development, the user can view, at the same time and in superposition, the two real and virtual environments. For example, when he considers modifications to the real environment (arrangement of a room or green space, work, etc.), the user can better understand the consequences of the modifications considered for the real space.

The development also relates to a mixed virtual reality headset, capable of being connected to an interface device. The headset comprises: a detector of position of the interface device in a real environment in which said headset is placed, the detector acquiring relative coordinates of a position of said interface device in the real environment, a processor configured to determine, following a reception of said user interaction signal from said interface device, depending on the relative coordinates, a corresponding point in an at least 2-dimensional virtual representation of a real environment of said real environment, a generator of said virtual representation from at least the point associated with the relative coordinates of the acquired position of said interface device.

The development also relates to an interface device capable of being connected to a mixed virtual reality headset and comprising: a transmitter exchanging with a locator of the interface device in a real environment in which said headset is placed, the locator acquiring relative coordinates of a position of said interface device in the real environment, a user interaction detector on said interface device, and a transmitter of a user interaction signal following said detected user interaction, the interaction signal being configured to trigger a generation of an at least 2-dimensional virtual representation of a real environment from at least the point associated with the relative coordinates of the acquired position of said interface device.

Correlatively, the development also relates to a system for generating an at least 2-dimensional virtual representation of a real environment, comprising a mixed virtual reality headset as previously described and at least one interface device as previously described.

The development also relates to a computer program including instructions for implementing the method for generating a virtual representation of a real environment according to any one of the previously described particular embodiments, when said program is executed by a processor. Such a program can use any programming language. It can be downloaded from a communications network and/or recorded on a computer readable medium. This program can use any programming language, and be in the form of source code, object code, or intermediate code between source code and object code, such as in a partially compiled form, or in any other desirable form.

According to yet another aspect, a recording medium or computer readable storage medium is proposed, which comprises instructions of a computer program as mentioned above. The aforementioned storage media can be any entity or device capable of storing the program. For example, the medium may include a storage means, such as a Read-Only Memory (ROM) type memory, for example a CD-ROM or a microelectronic circuit ROM, a flash memory mounted on a removable storage medium, such as a USB key, or else a Hard-Disk Drive (HDD) or Solid-State Drive (SSD) type magnetic mass memory, or a combination of memories operating according to one or more data recording technologies. On the other hand, the recording media can correspond to a transmissible medium such as an electrical or optical signal, which can be conveyed via an electrical or optical cable, by radio or by other means. In particular, the proposed computer program can be downloaded from an Internet type network.

Alternatively, the recording media can correspond to an integrated circuit in which the program is incorporated, the circuit being adapted to execute or to be used in the execution of the method in question.

The method for generating a virtual representation of a real environment mentioned above can therefore be implemented in various manners, in particular in hardware form or in software form, or be implemented in the form of a combination of hardware and software elements.

BRIEF DESCRIPTION OF THE DRAWINGS

Other features and advantages of the development will emerge more clearly on reading the following description of a particular embodiment, given by way of simple illustrative and non-limiting example, and the appended drawings, among which.

8A, the virtual representation being displayed in superposition with the real environment.

DETAILED DESCRIPTION OF CERTAIN ILLUSTRATIVE EMBODIMENTS

Figure 1:
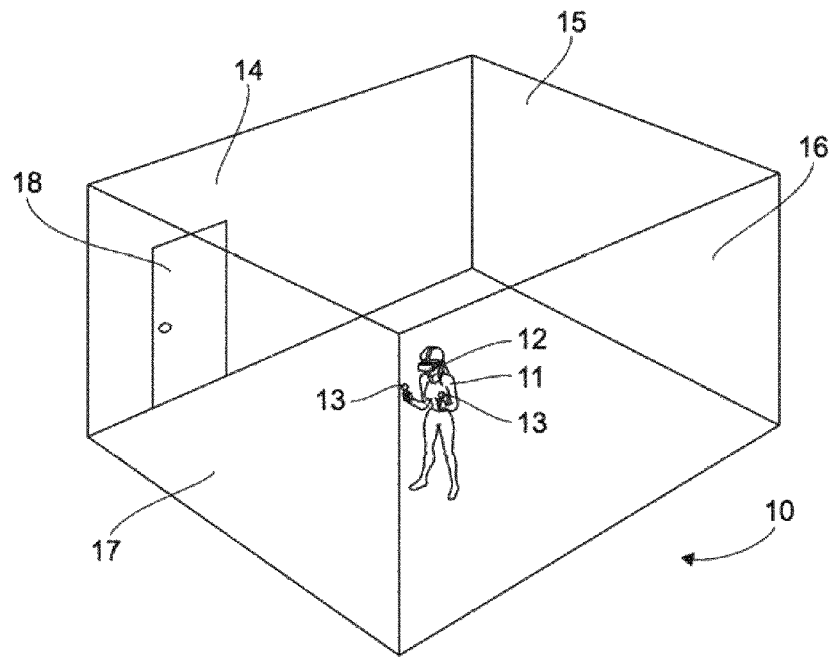
FIG. 1 illustrates an environment for implementing the development according to a particular embodiment of the development.

FIG. 1 illustrates an example of implementation of the development according to a particular embodiment of the development. FIG. 1 represents a real environment (10), herein a room, to be modelled. The real environment is herein simplified and comprises for example a room comprising 4 walls (14, 15, 16, 17) and a door (18).

A user (11) is placed in the room and equipped with a mixed virtual reality headset (12) adapted to implement the method of generating a virtual representation according to a particular embodiment of the development which will be described below in relation to FIG. 2.

Figure 5:
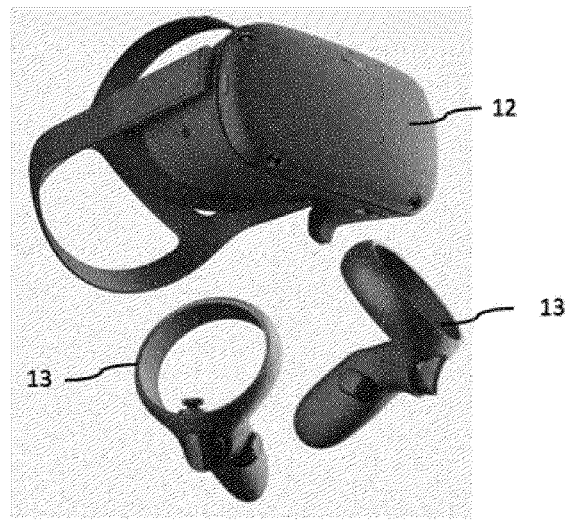
FIG. 5 illustrates an example of a mixed virtual reality headset and associated interface devices.

An example of a mixed virtual reality headset is illustrated in FIG. 5. It is for example an Oculus Quest headset. The mixed virtual reality headset (12) is associated with two interface devices (13), also called controllers, intended to be handled by a user of the headset and which allow the user to interact in the virtual environment projected by the headset (12).

Such a virtual reality headset is an autonomous headset in the sense that it does not require an additional terminal for its operation. Such a headset is equipped with sensors, for example cameras, to permanently detect the movements of the two controllers associated therewith.

Figure 2:
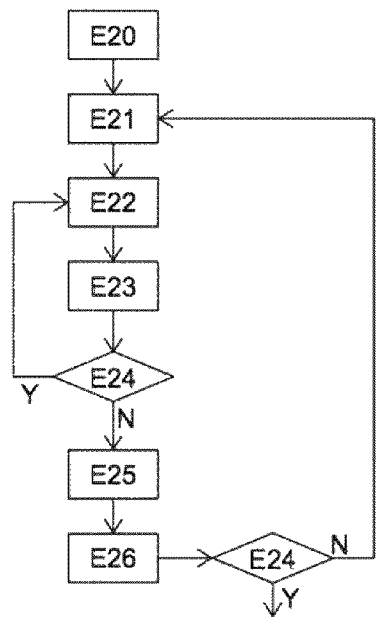
FIG. 2 illustrates steps of a method for generating an at least 2-dimensional virtual representation of a real environment, according to a particular embodiment of the development.

With reference to FIG. 2, steps of the method for generating a virtual representation of the environment illustrated in FIG. 1 are now described, according to a particular embodiment of the development. These steps are described in relation to FIG. 3 which illustrates the different measurement points in the real environment and the FIGS. 4A-4D which illustrate the virtual representation of the real environment at different stages of the modelling.

During a step E20, using the virtual reality headset (12) and a controller (13), the user launches a real environment modelling application which is previously installed in a memory of the headset. Such an application comprises in particular and in without limitation: menus allowing proposing actions for entering and manipulating objects of a virtual environment displayed to the user, menus for creating virtual objects such as a library of virtual elements to be added to the virtual environment, these virtual elements can have parameters defined by default, in particular of size, which can be modified manually or by taking measurements in the real environment as will be described below, menus for modifying virtual elements (colour, shape, texture).

When starting the application, a virtual representation is initialised by associating a mark position of origin (point 0 in FIG. 4A) in the virtual representation with the initial position of the user in the room. All coordinates determined by the virtual reality headset (coordinates of the headset when the user is moving, coordinates of the controllers when the user moves his hands and/or is moving) will be defined relative to this initial reference position.

The virtual reality headset (12) determines continuously, or at regular time intervals, the position coordinates of the headset itself and of the controllers (13).

The user will then proceed to take measurements of the room in order to model it.

Concerning the height of the room, the height can be predefined by default and adapted by the user or manually entered by the user. The user can also take a measurement on the floor and another on the ceiling in order to define the height of the ceiling.

The application then proceeds to the generation of the virtual representation via the modelling of the elements indicated by the user. For this, during a step E21, the user selects from a library of plan elements, an element to be modelled in the virtual representation. For example, herein it is a wall.

Depending on the application, the library of types of virtual elements to be added to the representation can include elements such as wall, window, door, floor, ceiling, luminaire, electrical socket, radiator, path, lawn, hedge, tree, etc.

During a step E22, the user moves towards the wall (14) that he wishes modelling and takes a measurement. To do this, he places one of the controllers on an edge of the wall (14) to be modelled, for example at point A in FIG. 3 and interacts on the controller (13). During step E22, the headset then receives a control signal from the controller (13).

Figure 4A:
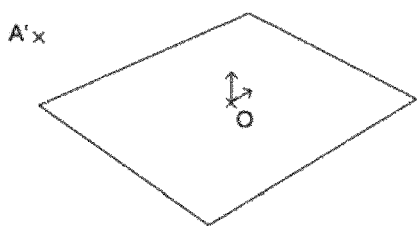
FIG. 4A illustrates an example of a 3D virtual representation of the real environment illustrated in FIG. 1 during the execution of the method for generating a virtual representation.

During a step E23, following the reception of the control signal from the controller (13), the virtual reality headset determines depending on the relative coordinates of the position of the controller in the real environment at the time when the user has interacted, a corresponding point in the virtual representation (herein the point A' in FIG. 4A). Possibly, the virtual reality headset associates the point thus determined with the coordinates depending on which this point has been determined. In other words, during step E23, the headset stores the relative coordinates of the controller, and possibly its orientation in space, which it continuously determines, at the time when the headset receives the control signal.

During a step E24, it is checked whether other measurements are necessary to model the selected plan element. The number of measurements depends on the type of the plan element to be modelled. For example, for a wall whose height is known, two measurements (one at each end of the wall) are sufficient. For a door, it can be interesting to take the measurements at all four corners of the door, or else to take just two measurements and define a default height, or else to take a single measurement defining the location of the door and to define a height and a width by default.

For example, if it is a door to be modelled in the virtual representation, such a door being non-existent in the real environment, a measurement to define the location may be sufficient.

If other measurements are necessary for the selected plan element, the method goes to step E22 and the user moves to another point of the room to take another measurement of the element to be modelled. For example, he goes to point B illustrated in FIG. 3.

Figure 4B:
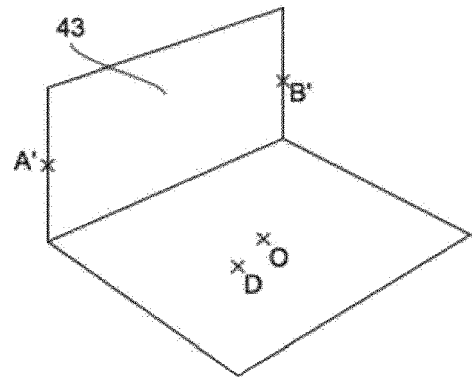
FIG. 4B illustrates an example of a 3D virtual representation of the real environment illustrated in FIG. 1 during the execution of the method for generating a virtual representation.

Steps E22 and E23 are iterated and point B' of the virtual representation illustrated in FIG. 4B is associated with the position B of the real environment.

When the number of measurements is sufficient to model the plan element, the method goes to step E25 during which the selected plan element is generated in the virtual representation. For example, in the case of the wall (14) to be modelled, a virtual wall (43) is modelled, as illustrated in FIG. 4B.

Alternatively, the generation of the plan element in the virtual representation can be triggered in step E25 at the initiative of the user, for example by a command selected in a menu. According to this variant, it is no longer determined in step E24 whether the number of measurements is sufficient. The method determines the dimensions of the plan element to be generated depending on the number of successive acquired positions and possibly depending on dimensions defined by default for the element when the number of measurements is not sufficient.

Advantageously, according to the development, the size of the virtual element generated in the virtual representation is to scale relative to the distance between the positions acquired in the real environment. Thus, the virtual representation is a faithful representation of the real environment and allows generating a 2D or 3D plan of the real environment in which the dimensions of each element relative to each other are respected.

During a step E26, the headset updates the virtual representation of the real environment being modelled by storing the generated new plan element. The application thus constructs, as the measurements are taken, the virtual representation of the real environment.

The virtual representation being modelled can be displayed by the headset to the user simultaneously with the visualisation of the real environment via the headset.

In this manner, the user sees the progressive construction of the virtual representation as measurements are taken and elements added to the representation.

In addition, the user can thus adapt the location or the size of the virtual elements generated in the virtual representation. For example, he can make a virtual opening coincide with a real opening, by grasping the object via an action on the controller and a displacement of his arm to the desired location.

The virtual representation can be displayed in actual size to the user. In other words, the virtual representation is displayed in superposition with the visualisation of the real environment. An example of such a visualisation is illustrated in FIG. 8B.

Figure 8A:
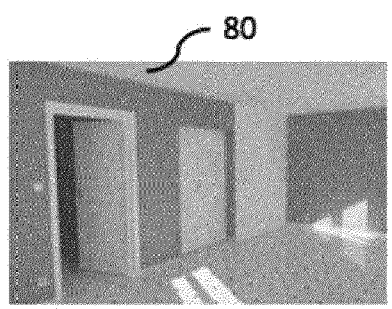
FIG. 8A illustrates another example of a real environment to be modelled.
Figure 8B:
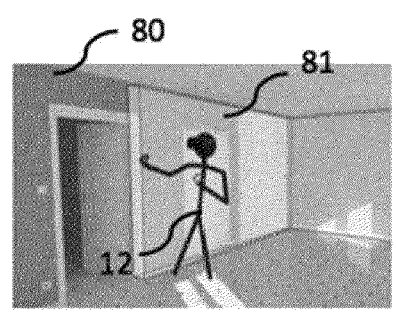
FIG. 8B illustrates an example of a virtual representation during generation of the real environment illustrated in FIG.

FIG. 8B illustrates an example of a virtual representation (81) during generation of a real environment (80) illustrated in FIG. 8A, the virtual representation (81) being displayed in superposition with the real environment (80). The examples illustrated in FIGS. 8A and 8B are shown from the point of view of an observer of the actual scene and not from the point of view of the user wearing the headset, for a better understanding.

In this example, the virtual representation (81) is transparently displayed so that the user (12) can see both the real environment and the virtual representation that he is building using the mixed virtual reality headset.

Figure 4C:
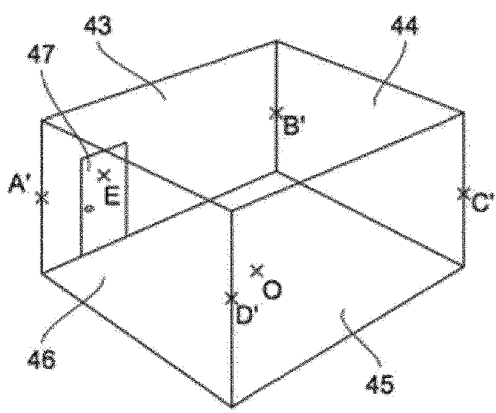
FIG. 4C illustrates an example of a 3D virtual representation of the real environment illustrated in FIG. 1 during the execution of the method for generating a virtual representation.

According to another example, the user can zoom out on the virtual representation in order to display it smaller, for example to view the virtual representation as a whole. An example of such a rendering is illustrated in FIG. 4C described below.

During a step E27, it is checked whether the user has left the mode of generation of the virtual representation. If this is not the case, the headset switches to standby mode for a new selection of an element to be added to the virtual representation.

Otherwise, the generation process ends.

The virtual representation generated by the virtual reality headset can be memorised in a file format to be used subsequently via a rendering on the virtual reality headset or any other adapted display means. The method for generating a virtual representation is described herein in the case of a 3D virtual representation. However, the method can be applied to the 2D modelling of a real environment to create an architect's plan for example. Or else, a 2D representation can be obtained by converting the generated 3D representation.

According to other examples, the generated virtual representation can then be used in a virtual reality environment. For example, the generated virtual representation can allow adapt a game to the user's real environment, or else be rendered to the user in virtual reality to allow the user of the headset to move around in the displayed virtual environment and possibly place virtual objects (furniture, etc.) therein, modify the appearance of the elements of the virtual representation (change colours, floors, ceilings, etc.).

Figure 3:
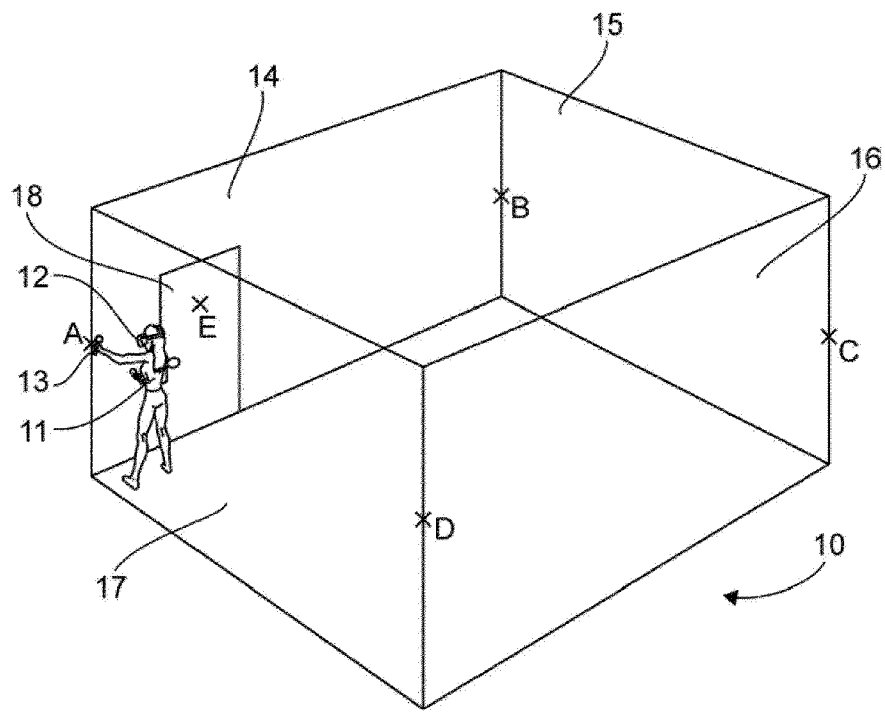
FIG. 3 illustrates an example of taking measurements in the real environment.

FIG. 4C illustrates an example of the virtual representation generated by the headset when the user has added the other three room walls (44, 45 and 46) and the door (47). FIG. 3 illustrates examples of positions (B, C, D, E) at which measurements could be taken using the headset and a controller and FIG. 4C illustrates the points (B', C', D', E') of the virtual representation associated with these positions and the corresponding generated plan elements (44, 45, 46, 47) in the virtual representation.

Figure 4D:
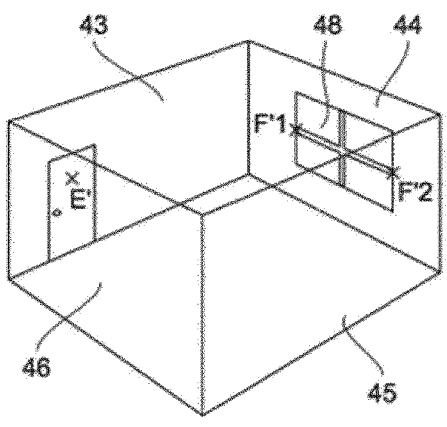
FIG. 4D illustrates an example of a 3D virtual representation of the real environment illustrated in FIG. 1 when executing the method for generating a virtual representation.

FIG. 4D illustrates an example of a virtual representation of the real environment illustrated in FIG. 3 in which the user has added a purely virtual plan element (48), i.e. not present in the real environment. For example, it is herein a window.

For this, during the generation method, during step E21, the user has selected a window-type plan element, and during step E22, he has positioned a controller at the position F1 of the real environment and interacts on the controller.

Following the reception of the control signal, during step E23, the headset has determined depending on the relative coordinates of the position F1 the point F'1 in the virtual representation. And, in a particular embodiment of step E23, the headset has also associated the relative coordinates of the position F1 with the point F'1.

Then, again, during step E22, the user has positioned a controller at the position F2 of the real environment and interacts on the controller and following the reception of the control signal, during step E23, the headset has determined depending on the relative coordinates of the position F2 the point F'2 in the virtual representation, then possibly associated them.

During step E25, a virtual window has been added in the virtual representation between the two points F'1 and F'2.

The method for generating a virtual representation described above allows the user to have a faithful 2D or 3D plan that is quick and easy to produce without the need for particular skills.

Figure 6:
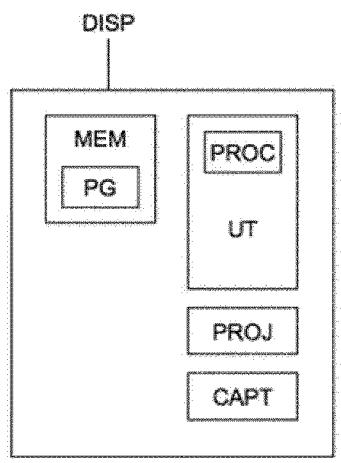
FIG. 6 illustrates in a simplified manner an example of architecture of a mixed virtual reality headset according to a particular embodiment of the development.

FIG. 6 illustrates in a simplified manner an example of architecture of a mixed virtual reality headset DISP according to a particular embodiment of the development.

Such a headset is configured to implement the method for generating a virtual representation according to any one of the previously described embodiments.

In the non-limiting example illustrated in FIG. 6, the headset DISP comprises a memory MEM, a processing unit UT, equipped for example with a processor PROC, and driven by the computer program PG stored in the memory MEM. The computer program PG comprises instructions to implement the steps of the method for generating a virtual representation as previously described, when the program is executed by the processor PROC.

On initialisation, the code instructions of the computer program PG are for example loaded into a memory before being executed by the processor PROC. The processor PROC of the processing unit UT implements, in particular, the method for generating a virtual representation according to any one of the embodiments described in relation to FIG. 2 according to the instructions of the computer program PG.

For this, the headset DISP comprises a detection device CAPT configured to detect controllers associated with the headset DISP. Such a detection device comprises in particular cameras to capture the movements of the controllers, as well as any movement of the user wearing the headset.

The headset DISP also comprises a projection device PROJ allowing visually rendering a virtual reality environment to the user, and in particular the virtual representation generated by the headset via the previously described method.

The headset DISP also comprises a communication interface COM allowing receiving a control signal from a controller associated with the headset.

Figure 7:
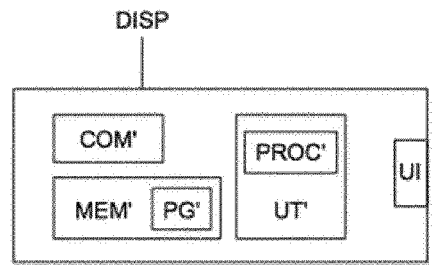
FIG. 7 illustrates in a simplified manner an example of architecture of an interface device according to a particular embodiment of the development.

FIG. 7 illustrates in a simplified manner an example of architecture of an interface device INT according to a particular embodiment of the development. The interface device INT is for example a controller associated with the headset described in relation to FIG. 6.

In the non-limiting example illustrated in FIG. 7, the interface device INT comprises a processing unit UT', equipped for example with a processor PROC', and driven by the computer program PG' stored in the memory MEM'. The processor PROC' and the memory MEM' are in particular configured to detect a user interaction on the interface device via a user interface UI of the interface device, and to emit a user interaction signal to the mixed virtual reality headset with which it is associated following the detected user interaction. For this, the interface device INT comprises a communication interface COM' for transmitting the user interaction signal or control signal to the headset.

The invention claimed is:

1. A generation method of generating an at least 2-dimensional virtual representation of a real environment, the generation being implemented by a mixed virtual reality headset intended to be worn by a user, the mixed virtual reality headset being associated with at least one interface device distinct from the mixed virtual reality headset, the generation method comprising:
   acquiring relative coordinates in the real environment, corresponding to a position of the interface device in the real environment;
   following an interaction of the user on the interface device, determining a corresponding point in the virtual representation depending on the relative coordinates of the position of the interface device in the real environment; and
   generating the virtual representation from at least the point associated with the relative coordinates of the acquired position of the interface device, said virtual representation being a 2D or 3D scale plan of the real environment.

2. The generation method according to claim 1, wherein the relative coordinates are defined relative to a reference position of the real environment, the reference position corresponding to an initial position of the virtual reality headset associated with a point of origin of a reference frame of the virtual representation.

3. The generation method according to claim 1, further comprising, when at least two points of the virtual representation are successively associated with at least two acquired positions of the interface device in the real environment, generating a virtual element in the virtual representation, the size of the virtual element generated in the virtual representation being to scale relative to the distance between the at least two positions acquired in the real environment.

4. The generation method according to claim 3, wherein a type of the virtual element is previously selected from a library of virtual element types.

5. The generation method according to claim 4, wherein the virtual element is a plan element, and the library of virtual element types comprises at least any one of the following types: wall, window, door, floor, ceiling, luminaire, electrical socket, radiator, path, lawn, hedge, tree.

6. The generation method according to claim 1, further comprising displaying via the mixed virtual reality headset of the virtual representation.

7. The generation method according to claim 6, wherein, the virtual representation is a 3-dimensional representation, and the displaying of the virtual representation is performed in superposition with the real environment viewed by the user via the mixed virtual reality headset.

8. A processing circuit comprising a processor and a memory, the memory storing code instructions of a computer program including instructions for implementing the method for generating an at least 2-dimensional virtual representation of a real environment according to claim 1, when the program is executed by the processor.

9. A non-transitory computer-readable medium including a computer program stored thereon comprising instructions which when executed by a processor of the mixed virtual reality headset configure the mixed virtual reality headset to execute the generation method according to claim 1.

10. The generation method according to claim 1, wherein the virtual representation is a 2D scale plan of the real environment.

11. The generation method according to claim 1, wherein the virtual representation is a 3D scale plan of the real environment.

12. A mixed virtual reality headset, capable of being connected to an interface device, the headset comprising:
   a detector of a position of the interface device in a real environment in which the headset is placed, the detector acquiring relative coordinates of the position of the interface device in the real environment, the interface device being distinct from the mixed virtual reality headset;
   a processor configured to determine a corresponding point in an at least 2-dimensional virtual representation of the real environment, following a reception of a user interaction signal from the interface device and depending on the relative coordinates; and
   a generator of the virtual representation from at least the point associated with the relative coordinates of the acquired position of the interface device, said virtual representation being a 2D or 3D scale plan of the real environment.

13. An interface device capable of being connected to a mixed virtual reality headset, the interface device being distinct from the mixed virtual reality headset and comprising:
   a first transmitter exchanging with a locator of the interface device in a real environment in which the headset is placed, the locator acquiring relative coordinates of a position of the interface device in the real environment;
   a user interaction detector on the interface device; and
   a second transmitter of a user interaction signal following a detected user interaction, the user interaction signal being configured to trigger a generation of an at least 2-dimensional virtual representation of the real environment from at least a point associated with the relative coordinates of the acquired position of the interface device, said virtual representation being a 2D or 3D scale plan of the real environment.

14. A system for generating an at least 2-dimensional virtual representation of a real environment, the system comprising:
- a mixed virtual reality headset capable of being connected to the interface device according to claim 13, the headset comprising:
  - a detector of the position of the interface device in the real environment in which the headset is placed, the detector acquiring relative coordinates of the position of the interface device in the real environment;
  - a processor configured to determine a corresponding point in an at least 2-dimensional virtual representation of the real environment, following a reception of the user interaction signal from the interface device and depending on the relative coordinates;
  - a generator of the virtual representation from at least the point associated with the relative coordinates of the acquired position of the interface device, said virtual representation being a 2D or 3D scale plan of the real environment; and
- the interface device according to claim 13.

* * * * *